(12) United States Patent
Arai

(10) Patent No.: US 8,111,483 B2
(45) Date of Patent: Feb. 7, 2012

(54) DISK DRIVE FLEXURE

(75) Inventor: Hajime Arai, Yokohama (JP)

(73) Assignee: NHK Spring Co., Ltd., Yokohama-shi (JP)

( * ) Notice: Subject to any disclaimer, the term of this patent is extended or adjusted under 35 U.S.C. 154(b) by 84 days.

(21) Appl. No.: 12/778,321

(22) Filed: May 12, 2010

(65) Prior Publication Data

US 2010/0290160 A1 Nov. 18, 2010

(30) Foreign Application Priority Data

May 15, 2009 (JP) ................................ 2009-118631

(51) Int. Cl.
*G11B 21/16* (2006.01)

(52) U.S. Cl. .................................................. 360/245.9

(58) Field of Classification Search ................. 360/249.9
See application file for complete search history.

(56) References Cited

U.S. PATENT DOCUMENTS

| | | | |
|---|---|---|---|
| 5,717,547 A | | 2/1998 | Young |
| 6,965,501 B1 * | | 11/2005 | Pan et al. .................... 360/245.7 |
| 7,218,481 B1 * | | 5/2007 | Bennin et al. ............... 360/294.4 |
| 7,372,669 B2 * | | 5/2008 | Deguchi et al. ............. 360/245.9 |
| 7,440,236 B1 * | | 10/2008 | Bennin et al. ............... 360/294.4 |
| 7,518,830 B1 * | | 4/2009 | Panchal et al. .............. 360/245.8 |
| 7,609,482 B2 * | | 10/2009 | Kiyono .......................... 360/246 |
| 7,724,478 B2 * | | 5/2010 | Deguchi et al. ............. 360/245.9 |
| 7,764,467 B2 * | | 7/2010 | Hanya et al. ................ 360/245.7 |

* cited by examiner

*Primary Examiner* — Mark Blouin

(74) *Attorney, Agent, or Firm* — Holtz, Holtz, Goodman & Chick, PC

(57) ABSTRACT

A first conductor member includes an amplifier-side first conductor, a head-side first conductor, and first and second interleaved conductors. A second conductor member includes an amplifier-side second conductor, a head-side second conductor, and third and fourth interleave conductors. The second interleaved conductor is connected to the amplifier-side first conductor through a first jumper conductor. The fourth interleave conductor is connected to the head-side second conductor through a second jumper conductor. The jumper conductors are formed by partially etching a metal base. The jumper conductors are individually inclined at angles of 45° or less to an axis which extends in a wiring direction of each of the interleaved conductors.

8 Claims, 10 Drawing Sheets

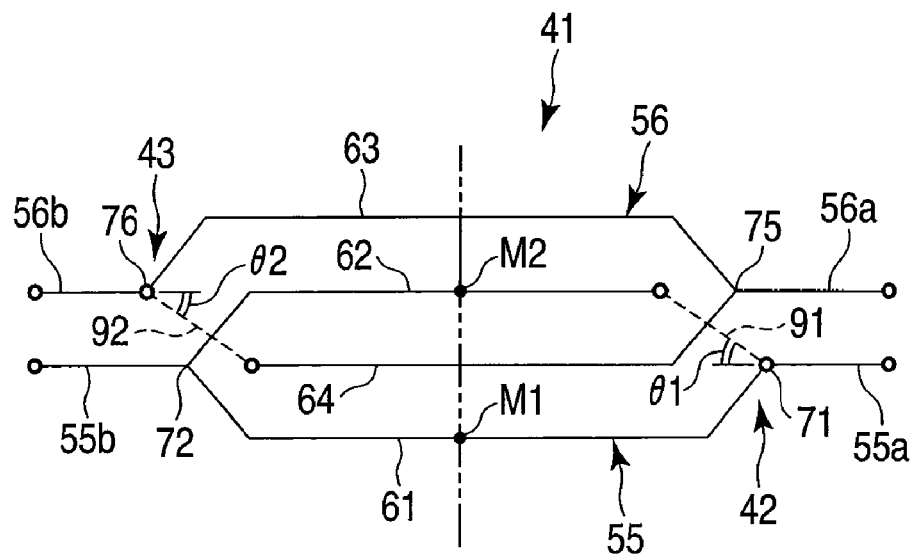
F I G. 8
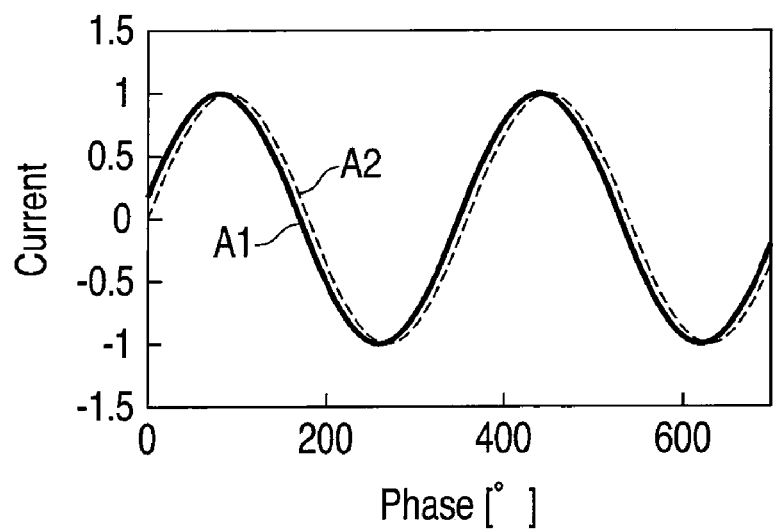
F I G. 9

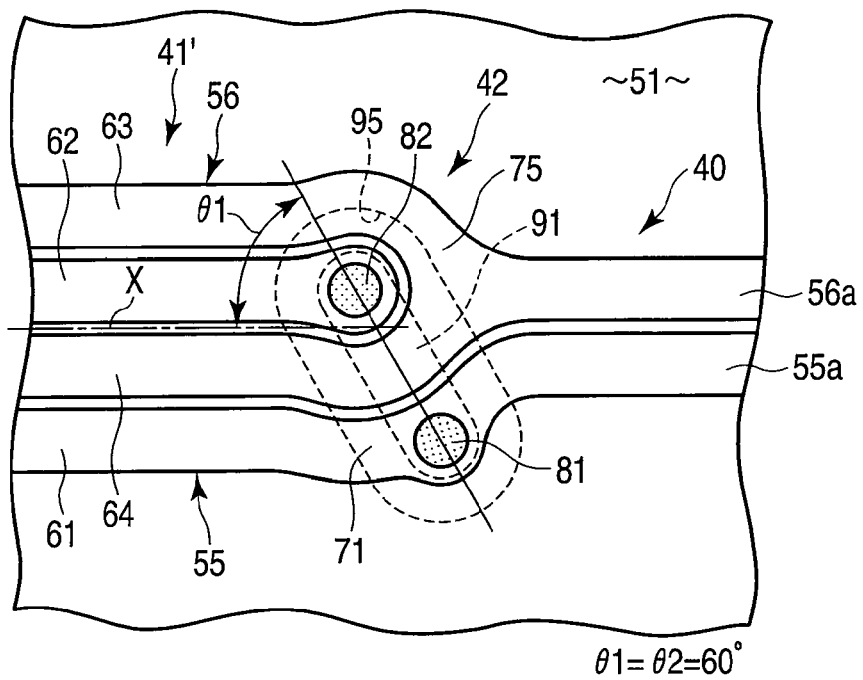
F I G. 12
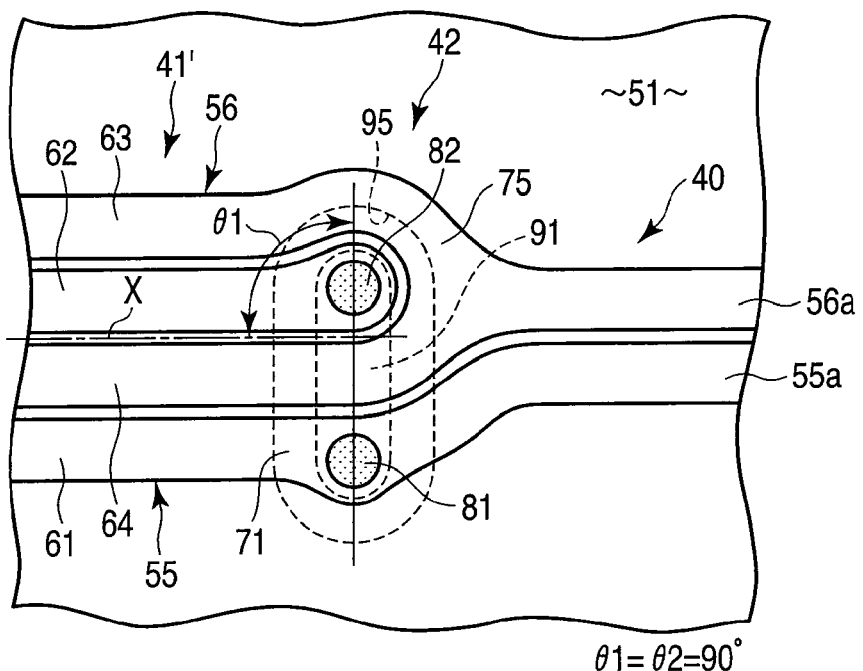
F I G. 13

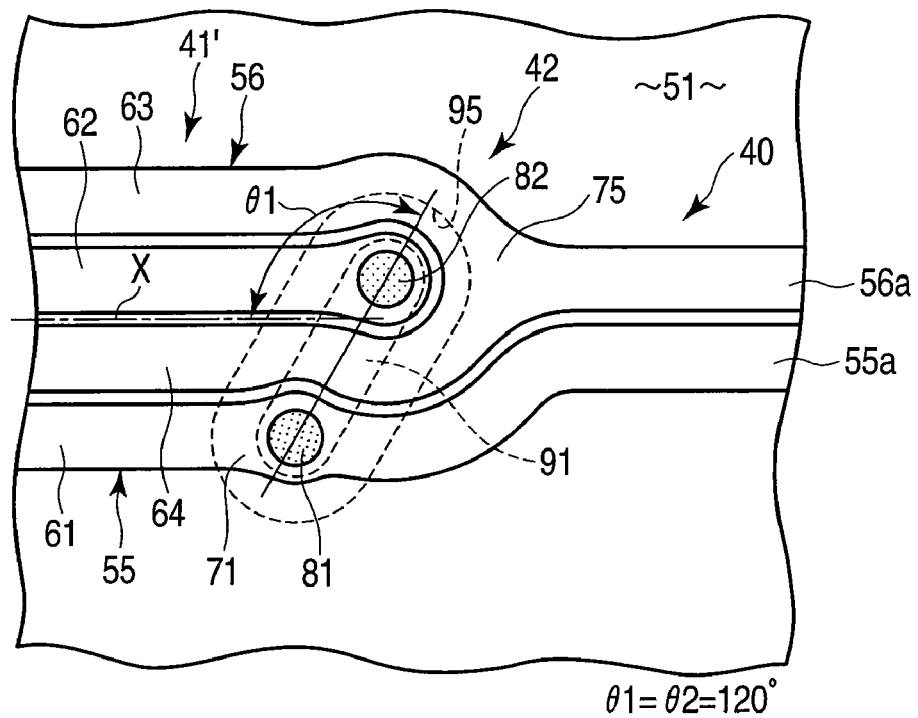
F I G. 14
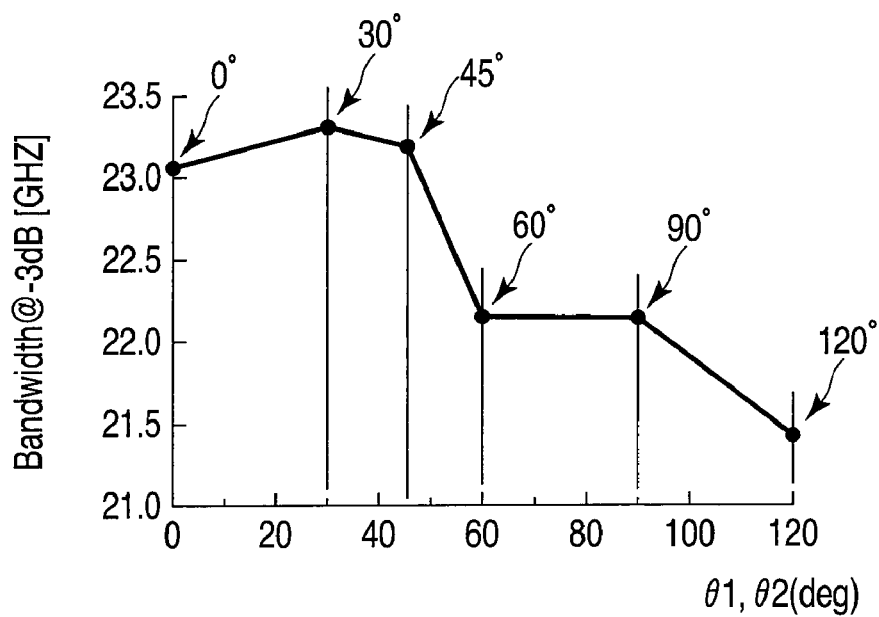
F I G. 15

DISK DRIVE FLEXURE

CROSS-REFERENCE TO RELATED APPLICATIONS

This application is based upon and claims the benefit of priority from prior Japanese Patent Application No. 2009-118631, filed May 15, 2009, the entire contents of which are incorporated herein by reference.

BACKGROUND OF THE INVENTION

1. Field of the Invention

This invention relates to a flexure used in a disk drive for an information processing apparatus, such as a personal computer.

2. Description of the Related Art

A hard disk drive (HDD) is used in an information processing apparatus, such as a personal computer. The hard disk drive comprises a magnetic disk rotatable about a spindle, carriage turnable about a pivot, etc. A disk drive suspension is disposed on an arm of the carriage.

The disk drive suspension comprises a baseplate and load beam. A flexure is located on the load beam. A slider is mounted on a gimbal portion formed near the distal end of the flexure. The slider is provided with elements (transducers) for accessing data, that is, for reading or writing data. The suspension, flexure, etc., constitute a head gimbal assembly.

The flexure is any of various available types used depending on the required specifications. A flexure with conductors is a known example. The flexure with conductors comprises a metal base formed of a thin stainless-steel plate, resin layer formed of an electrically insulating resin, such as polyimide, a plurality of conductors of copper, etc. The resin layer is formed on the metal base. The conductors are formed on the resin layer. One end of each conductor is connected to an amplifier or the like of the disk drive. The other end of each conductor is connected to an element (e.g., MR element) of the slider.

The impedance of a conductive circuit portion of the flexure is expected to be reduced in order to match the amplifier and the element of the slider and reduce energy consumption. The inductance is also expected to be reduced. For higher data transfer, moreover, such a property (low-attenuation property) is required that attenuation is low even in a high-frequency band.

A flexure with conductors comprising multi-trace transmission lines can effectively meet these requirements. A circuit provided with the multi-trace transmission lines is also called an interleave circuit. A flexure with an interleave circuit is disclosed in U.S. Pat. No. 5,717,547. The flexure of this type is suitable for high-speed data transfer because of its low attenuation in the high-frequency.

FIG. 16 shows an example of a conventional interleave circuit. This interleave circuit comprises first to fourth interleaved conductors 201 to 204. The first and second interleaved conductors 201 and 202 diverge from a first conductor member 211. The third and fourth interleaved conductors 203 and 204 diverge from a second conductor member 212.

Thus, the second and fourth interleaved conductors 202 and 204 three-dimensionally cross at an intersection 220. Further, the second and third interleaved conductors 202 and 203 three-dimensionally cross at an intersection 221. Connecting wires 230 and 231 with electrically insulating coatings are used to prevent short-circuiting of the intersections 220 and 221.

If the connecting wires 230 and 231 are used for the intersections 220 and 221, as in the prior art example shown in FIG. 16, they inevitably project vertically relative to the interleave circuit, so that the thickness of the interleave circuit cannot be reduced favorably. Since the connecting wires 230 and 231 are required in addition to the interleaved conductors 201 to 204, moreover, there is also a problem of an increase in the number of components.

The inventor hereof carried out a test in which high-frequency data was transferred to the interleave circuit shown in FIG. 16. In this test, the respective phases of the waveforms of currents that flow through respective midpoints m1 and m2 of the interleaved conductors 201 and 202 were measured. Consequently, it was found that a substantial phase difference was produced between current waveforms W1 and W2, as shown in FIG. 17, and variation in properties was caused by electrical interaction or the like. It was also found that, depending on the mounted state of the connecting wires 230 and 231, high-frequency attenuation, in particular, may be so high that high-speed data transfer is hindered.

BRIEF SUMMARY OF THE INVENTION

The present invention provides a disk drive flexure having excellent electrical properties, such as low high-frequency attenuation, and configured so that an interleave circuit can be prevented from becoming thick.

The present invention is a disk drive flexure, which comprises a metal base formed of a metal plate, an electrically insulating resin layer formed on the metal base and comprising a first surface in contact with the metal base and a second surface located opposite from the metal base, a first conductor member disposed on the second surface of the resin layer, and a second conductor member disposed parallel to the first conductor member on the second surface of the resin layer.

The first conductor member comprises an amplifier-side first conductor connected to an amplifier, a head-side first conductor connected to a magnetic head, a first interleaved conductor formed between the amplifier-side first conductor and the head-side first conductor, connecting with the amplifier-side first conductor through a first conductor branch section, and connecting with the head-side first conductor through a first conductor joint section, and a second interleaved conductor extending parallel to the first interleaved conductor and connecting with the head-side first conductor through the first conductor joint section.

The second conductor member comprises an amplifier-side second conductor connected to the amplifier, a head-side second conductor connected to the magnetic head, a third interleaved conductor formed between the amplifier-side second conductor and the head-side second conductor, connecting with the amplifier-side second conductor through a second conductor branch section, and connecting with the head-side second conductor through a second conductor joint section, and a fourth interleaved conductor located between and parallel to the first interleaved conductor and the second interleaved conductor and connecting with the amplifier-side second conductor through the second conductor branch section.

The flexure of the invention further comprises a first jumper conductor formed on the first surface of the resin layer so as to be flush with the metal base, electrically isolated from the metal base, connecting with the first conductor branch section through a first terminal which penetrates the resin layer relative to the thickness thereof, and connecting with the second interleaved conductor through a second terminal which penetrates the resin layer relative to the thickness thereof, and a second jumper conductor formed on the first surface of the resin layer so as to be flush with the metal base, electrically isolated from the metal base, connecting with the second conductor joint section through a third terminal which penetrates the resin layer relative to the thickness thereof, and connecting with the fourth interleaved conductor through a fourth terminal which penetrates the resin layer relative to the thickness thereof. The first jumper conductor and the second jumper conductor are individually angled less than 45° to an axis which extends in a wiring direction of each of the interleaved conductors.

According to this arrangement, the first and second jumper conductors that are flush with the metal base are angled at 45° or less to the axis which extends in the wiring direction of each interleaved conductor. Thus, the high-frequency attenuation can be reduced, and an interleave circuit suitable for high-speed data transfer can be obtained.

Further, the amplifier-side first conductor and the second interleaved conductor conduct to each other through the insular first jumper conductor that is flush with the metal base. Furthermore, the head-side second conductor and the fourth interleaved conductor conduct to each other through the insular second jumper conductor that is flush with the metal base. Thus, the jumper conductors never project outwardly relative to the thickness of the interleave circuit. If the jumper conductors are formed by partially etching the metal base, the number of components for the jumper conductors cannot be increased, and the respective surfaces of the jumper conductors can be made flush with that of the metal base.

Preferably, in the present invention, each of the first and second jumper conductors is an insular portion formed by partially etching the metal base. Preferably, moreover, the respective angles of the first and second jumper conductors are equal.

In the present invention, the flexure may further comprise a first bent portion formed between the first conductor branch section and the first interleaved conductor and bent opposite from the first jumper conductor with respect to the axis and a second bent portion formed between the second conductor joint section and the third interleaved conductor and bent opposite from the second jumper conductor with respect to the axis.

Further, an interleaved branch section formed on one end portion of the interleave circuit and an interleaved joint section formed on the other end portion of the interleave circuit may be point-symmetrical with respect to a longitudinal midpoint of the interleave circuit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 8 is a circuit diagram typically showing the interleave circuit shown in FIG. 4;

FIG. 9 is a diagram showing the phases of currents flowing through first and second interleaved conductors of the interleave circuit shown in FIG. 8;

FIG. 12 is a partial plan view of an interleave circuit showing a first comparative example;

FIG. 13 is a partial plan view of an interleave circuit showing a second comparative example;

FIG. 14 is a partial plan view of an interleave circuit showing a third comparative example;

FIG. 15 is a diagram showing relationships between the bandwidth and angles of jumper conductors;

DETAILED DESCRIPTION OF THE INVENTION

A first embodiment of the present invention will now be described with reference to FIGS. 1 to 9.

Figure 1:
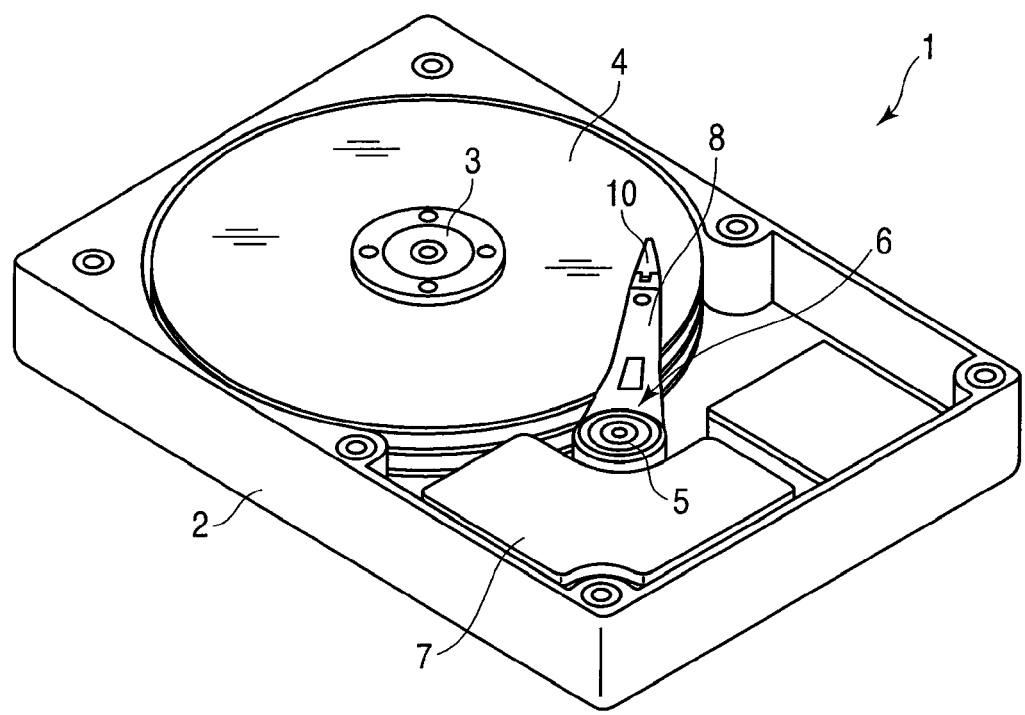
FIG. 1 is a perspective view showing an example of a disk drive with a suspension.

A hard disk drive (hereinafter referred to as a "disk drive") 1 shown in FIG. 1 comprises a case 2, magnetic disks 4, carriage 6, and positioning motor 7. The magnetic disks 4 are rotatable about a spindle 3. The carriage 6 is turnable about a pivot 5. The positioning motor 7 turns the carriage 6. The case 2 is covered by a lid (not shown).

Figure 2:
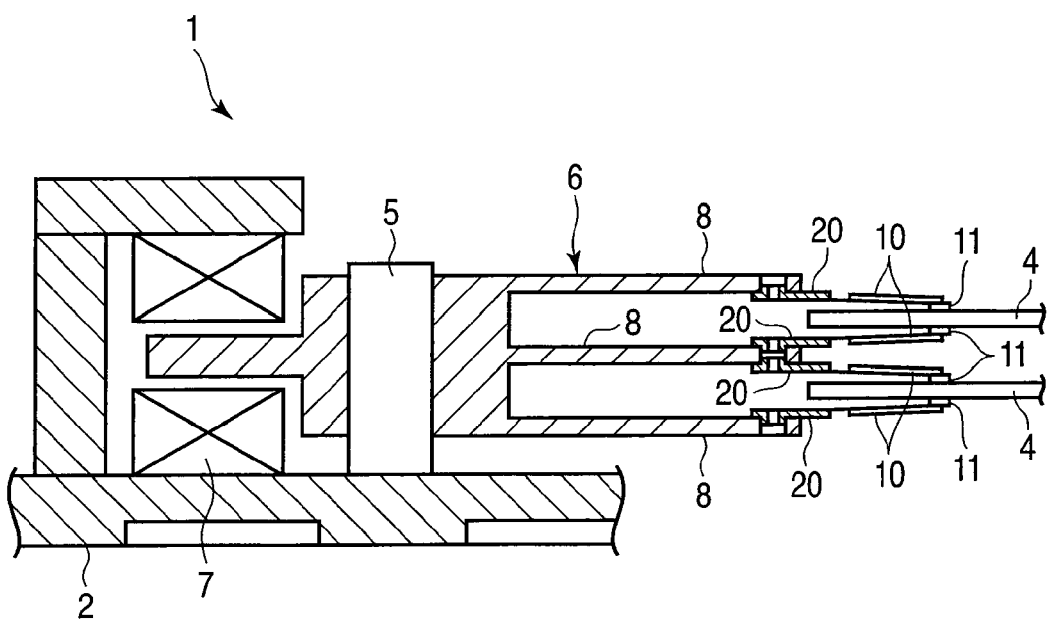
FIG. 2 is a partial sectional view of the disk drive shown in FIG. 1.

FIG. 2 is a sectional view typically showing a part of the disk drive 1. As shown in FIG. 2, the carriage 6 comprises a plurality of (e.g., three) actuator arms 8. Suspensions 10 are mounted individually on the respective distal end portions of the actuator arms 8. A slider 11, which constitutes a magnetic head, is disposed on the distal end of each of the suspensions 10.

If the magnetic disks 4 rotate at high speed about the spindle 3, an air bearing is formed between each disk 4 and slider 11. If the carriage 6 is moved by the positioning motor 7, each slider 11 moves to a desired track of the disk 4. The slider 11 comprises elements, such as MR elements capable of performing conversion between electrical and magnetic signals. By means of these elements, data can be accessed, that is, written to or read from the recording surface of the disk 4.

Figure 3:
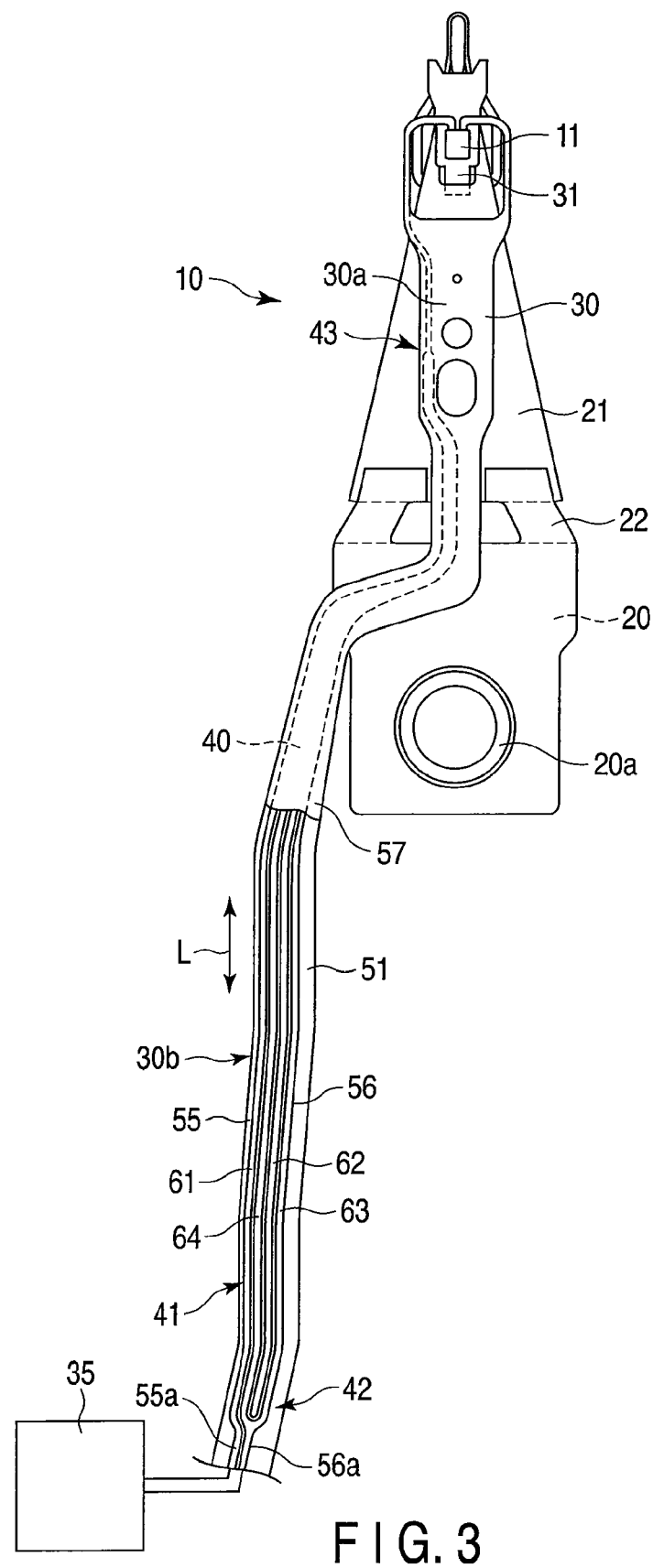
FIG. 3 is a plan view of a head gimbal assembly comprising a disk drive flexure according to a first embodiment of the invention.

FIG. 3 shows an example of a head gimbal assembly comprising the suspension 10. The suspension 10 comprises a baseplate 20, load beam 21, and hinge member 22 formed of a thin spring plate. A boss portion 20a of the baseplate 20 is fixed to the actuator arm 8.

The suspension 10 is provided with a flexure 30 with conductors. The flexure 30 with conductors will hereinafter be referred to simply as the flexure 30. The flexure 30 is located along the load beam 21. Overlapping portions 30a of the flexure 30 and load beam 21 are fixed to each other by fixing means, such as laser welding. A tongue 31, which functions as a gimbal portion, is formed near the distal end of the flexure 30. The slider 11 is mounted on the tongue 31. A rear portion (tail portion) 30b of the flexure 30 extends toward an amplifier 35, which is located behind the baseplate 20.

The flexure 30 comprises a conductive circuit portion 40 extending longitudinally relative to it (or in the direction indicated by arrow L in FIG. 3). One end of the circuit portion 40 is connected electrically to the amplifier 35 (FIG. 3) of the disk drive 1 through a circuit board or junction circuit (not shown). The other end of the circuit portion 40 is connected electrically to an element of the slider 11 that functions as the magnetic head.

An interleave circuit 41 is formed on a longitudinal part of the conductive circuit portion 40.

Figure 4:
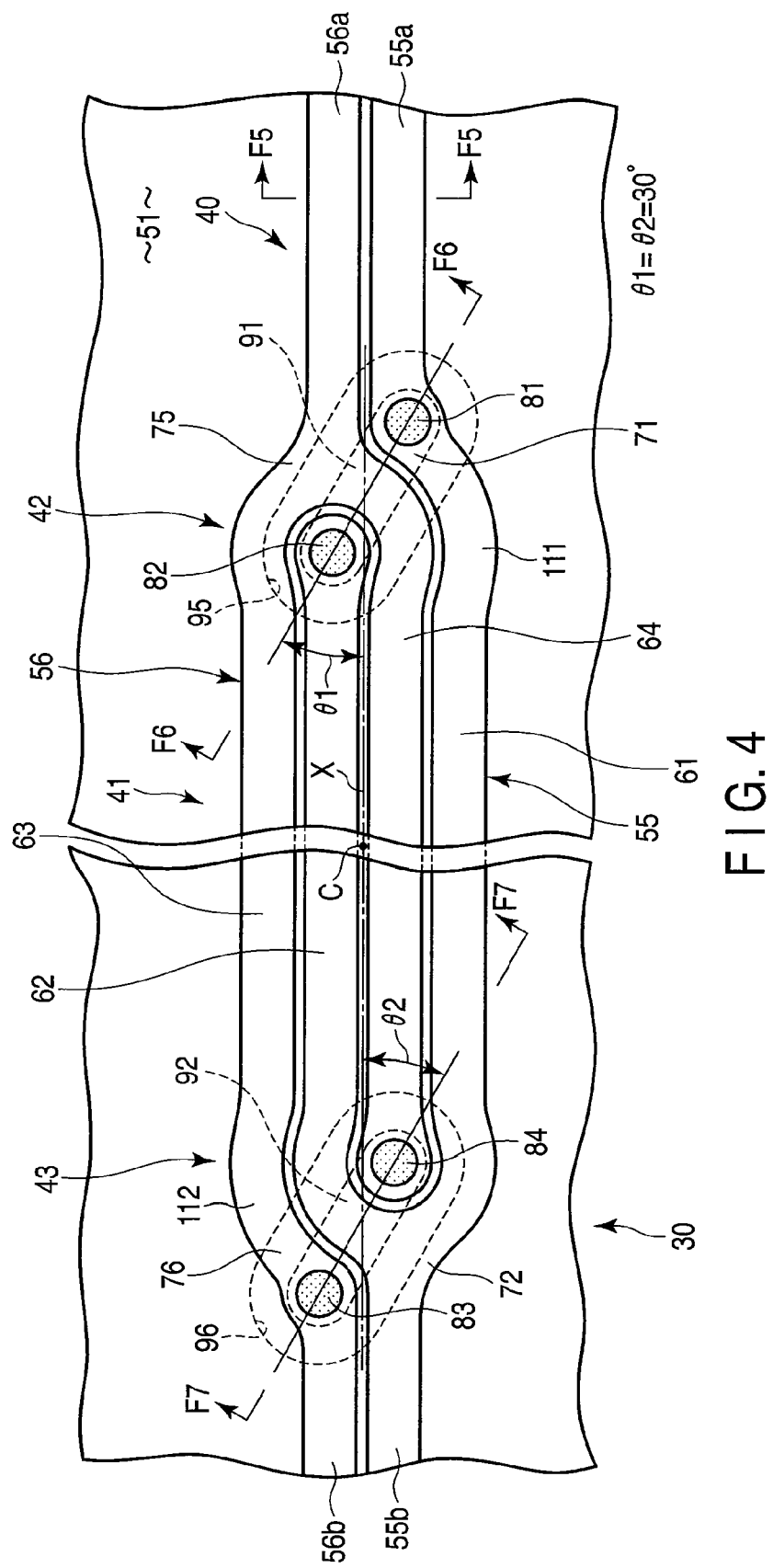
FIG. 4 is a partially enlarged plan view of an interleave circuit of the disk drive flexure shown in FIG. 3.

FIG. 4 shows an interleaved branch section 42 and interleaved joint section 43. The interleaved branch section 42 is formed on one end portion of the interleave circuit 41. The interleaved joint section 43 is formed on the other end portion of the interleave circuit 41. The interleaved branch and joint sections 42 and 43 will be described in detail later.

Figure 5:
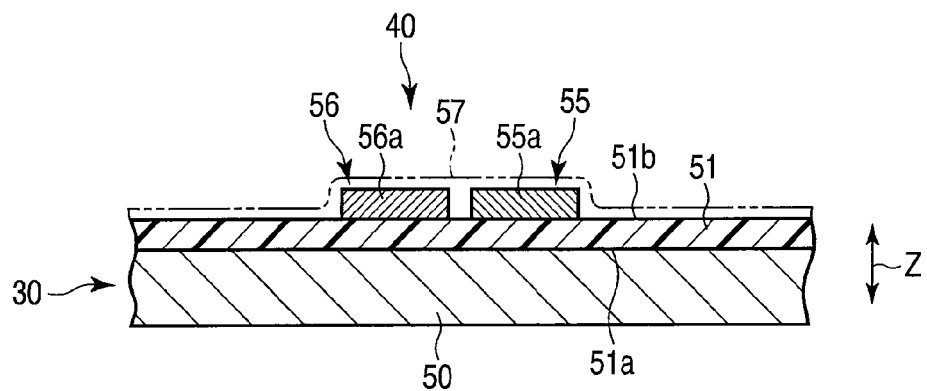
FIG. 5 is a sectional view of a conductive circuit portion taken along line F5-F5 of FIG. 4.

FIG. 5 is a sectional view showing a part of the conductive circuit portion 40 of the flexure 30. The conductive circuit portion 40 comprises a metal base 50 formed of a metal plate, electrically insulating resin layer 51, first and second conductor members 55 and 56 for writing, cover layer 57, etc. The resin layer 51 is formed on the metal base 50. The cover layer 57 is formed of an electrically insulating resin, such as polyimide, and covers the conductor members 55 and 56. Arrow Z in FIG. 5 indicates the thickness direction of the metal base 50, resin layer 51, and conductor members 55 and 56. A part of the cover layer 57 is omitted from the flexure 30 shown in FIG. 3.

The metal base 50 is formed of a metal plate, such as a stainless-steel plate. The metal base 50 is thinner than the load beam 21 and is, for example, 15 to 20 μm thick. The load beam 21 is, for example, 30 to 62 μm thick.

The resin layer 51 has a first surface 51a in contact with the metal base 50 and a second surface 51b located opposite from the metal base 50. The first and second conductor members 55 and 56 are formed parallel to each other on the second surface 51b of the resin layer 51. An example of the thickness of the resin layer 51 is 10 μm, while that of the cover layer 57 is about 3 μm.

The first and second conductor members 55 and 56 are formed of a highly electrically conductive metal, such as deposited copper. The conductor members 55 and 56 are formed individually into predetermined patterns by etching along the second surface 51b of the resin layer 51. Alternatively, the conductor members 55 and 56 may be formed into the predetermined patterns by plating without involving etching. The first and second conductor members 55 and 56 are continuous longitudinally relative to the flexure 30. An example of the thickness of each of the conductor members 55 and 56 is 10 μm. The flexure 30 also comprises a pair of reading conductors (not shown).

The interleave circuit 41 is formed on a longitudinal part of the conductive circuit portion 40. FIG. 4 shows the interleaved branch section 42 and interleaved joint section 43. The interleaved branch section 42 is formed on the one end portion of the interleave circuit 41. The interleaved joint section 43 is formed on the other end portion of the interleave circuit 41. The interleaved branch and joint sections 42 and 43 are arranged substantially diametrically symmetrical with respect to a longitudinal midpoint C (FIG. 4) of the interleave circuit 41.

The first conductor member 55 shown in FIG. 4 comprises an amplifier-side first conductor 55a, head-side first conductor 55b, first interleaved conductor 61, and second interleaved conductor 62. The amplifier-side first conductor 55a is connected to the amplifier 35 (FIG. 3). The head-side first conductor 55b is connected to the element of the magnetic head (slider 11).

The second conductor member 56 comprises an amplifier-side second conductor 56a connected to the amplifier 35, head-side second conductor 56b connected to the element of the magnetic head (slider 11), third interleaved conductor 63, and fourth interleaved conductor 64. The interleaved conductors 61 to 64 are arranged parallel to one another. The interleave circuit 41 has an axis X extending longitudinally relative to the interleaved conductors 61 to 64 (or in a reference wiring direction). The interleaved conductors 61 to 64 extend longitudinally relative to the flexure 30 along the axis X.

The first interleaved conductor 61 is formed between the amplifier-side first conductor 55a and head-side first conductor 55b. The first interleaved conductor 61 connects with the amplifier-side first conductor 55a through a first conductor branch section 71. Further, the first and second interleaved conductors 61 and 62 connect with the head-side first conductor 55b through a first conductor joint section 72.

The third interleaved conductor 63 is formed between the amplifier-side second conductor 56a and head-side second conductor 56b. The third interleaved conductor 63 connects with the amplifier-side second conductor 56a through a second conductor branch section 75. Further, the third interleaved conductor 63 connects with the head-side second conductor 56b through a second conductor joint section 76. The fourth interleaved conductor 64 connects with the amplifier-side second conductor 56a through the second conductor branch section 75.

The fourth interleaved conductor 64 is located between and parallel to the first and second interleaved conductors 61 and 62. The second interleaved conductor 62 is located between and parallel to the third and fourth interleaved conductors 63 and 64.

Figure 6:
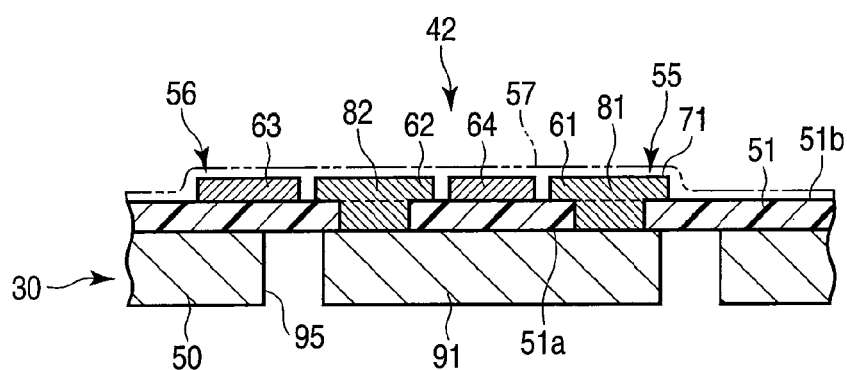
FIG. 6 is a sectional view of an interleaved branch section taken along line F6-F6 of FIG. 4.

FIG. 6 is a sectional view showing the interleaved branch section 42. In the example shown in FIG. 6, the load beam 21 does not exist relative to the thickness of the flexure 30. Depending on the position of the interleave circuit 41, however, the load beam 21 may exist relative to the thickness of the flexure 30.

The interleaved branch section 42 comprises first and second terminals 81 and 82 and first jumper conductor 91 formed of an electrically conductive material. The first and second terminals 81 and 82 individually penetrate the resin layer 51 relative to its thickness. The terminals 81 and 82 are formed simultaneously with the conductor members 55 and 56 that are formed by plating. Specifically, the terminals 81 and 82 are formed of the same material as the conductor members 55 and 56. Alternatively, however, the terminals 81 and 82 may be formed by depositing a material different from that of the conductor members 55 and 56.

The first jumper conductor 91 is formed on the first surface 51a of the resin layer 51 so as to be flush with the metal base 50. The first jumper conductor 91 is formed of a metallic material (stainless-steel plate) shared by the metal base 50. This conductor 91 is insular and is electrically insulated from the metal base 50. The first jumper conductor 91 electrically conducts to the first conductor branch section 71 through the first terminal 81. Further, the conductor 91 electrically conducts to the second interleaved conductor 62 through the second terminal 82.

Figure 7:
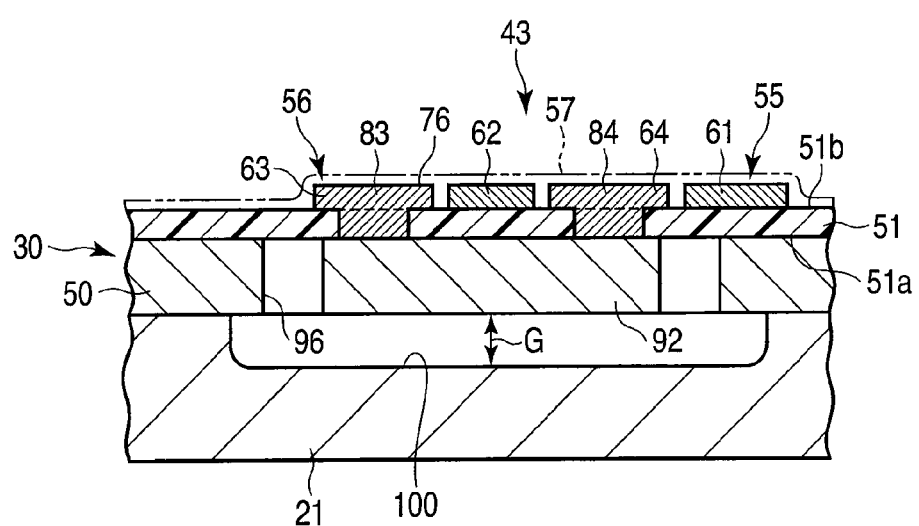
FIG. 7 is a sectional view of an interleaved joint section taken along line F7-F7 of FIG. 4.

FIG. 7 is a sectional view showing the interleaved joint section 43. In the example shown in FIG. 7, the load beam 21 exists relative to the thickness of the flexure 30. Depending on the position of the interleave circuit 41, however, the load beam 21 may not exist relative to the thickness of the flexure 30. The interleaved joint section 43 is formed at that part 30a of the overall longitudinal length of the flexure 30 which overlaps of the load beam 21. The interleaved joint section 43 comprises third and fourth terminals 83 and 84 and second jumper conductor 92 formed of an electrically conductive material.

The third and fourth terminals 83 and 84 individually penetrate the resin layer 51 relative to its thickness. The terminals 83 and 84 are formed of the same material as the conductor members 55 and 56 that are formed by plating, for example. Alternatively, however, the terminals 83 and 84 may be formed by depositing a material different from that of the conductor members 55 and 56.

The second jumper conductor 92, like the first jumper conductor 91, is formed on the first surface 51a of the resin layer 51 so as to be flush with the metal base 50. The second jumper conductor 92 is formed of a metallic material (stainless-steel plate) shared by the metal base 50. This conductor 92 is insular and is electrically insulated from the metal base 50. The second jumper conductor 92 electrically conducts to the second conductor joint section 76 through the third terminal 83. Further, the conductor 92 electrically conducts to the fourth interleaved conductor 64 through the fourth terminal 84.

As shown in FIG. 7, the interleaved joint section 43 is formed at that part 30a of the flexure 30 which overlaps of the load beam 21. Therefore, the load beam 21 is formed with a depression 100 in a position opposite to the second jumper conductor 92. The depression 100 serves to secure an electrically insulating space G between the second jumper conductor 92 and load beam 21. The depression 100 is formed by, for example, half-etching a part of the load beam 21. Instead of forming the depression 100, an opening (through-hole) may be formed penetrating the load beam 21 relative to the thickness.

The first and second jumper conductors 91 and 92 are individually outlined by partially etching the metal base 50. Specifically, the respective contours of the conductors 91 and 92 are defined by continuous annular slits 95 and 96, as viewed vertically relative to the metal base 50. Thus, the insular jumper conductors 91 and 92 that are electrically independent of the metal base 50 are formed by partially etching the stainless-steel plate as the material of the metal base 50. In this case, each of the jumper conductors 91 and 92 is as thick as the metal base 50. Accordingly, the respective surfaces of the conductors 91 and 92 are flush with that of the metal base 50. Thus, the conductors 91 and 92 never project outwardly relative to the thickness of metal base 50.

As shown in FIG. 4, the first jumper conductor 91 is angled at θ1 of 30° to the axis X of the interleave circuit 41. The axis X extends longitudinally relative to the interleave circuit 41 (or in the reference wiring direction). A first bent portion 111 is formed between the first interleaved conductor 61 and first conductor branch section 71. The first bent portion 111 is bent opposite from the first jumper conductor 91 with respect to the axis X.

The second jumper conductor 92 is also angled at θ2 of 30° to the axis X. A second bent portion 112 is formed between the third interleaved conductor 63 and second conductor joint section 76. The second bent portion 112 is bent opposite from the second jumper conductor 92 with respect to the axis X.

In the interleave circuit 41 constructed in this manner, the first and second jumper conductors 91 and 92 are formed into independent insular shapes by partially etching the metal base 50. Thus, the interleave circuit 41 can be prevented from becoming thick despite the arrangement of the jumper conductors 91 and 92.

Figure 17:
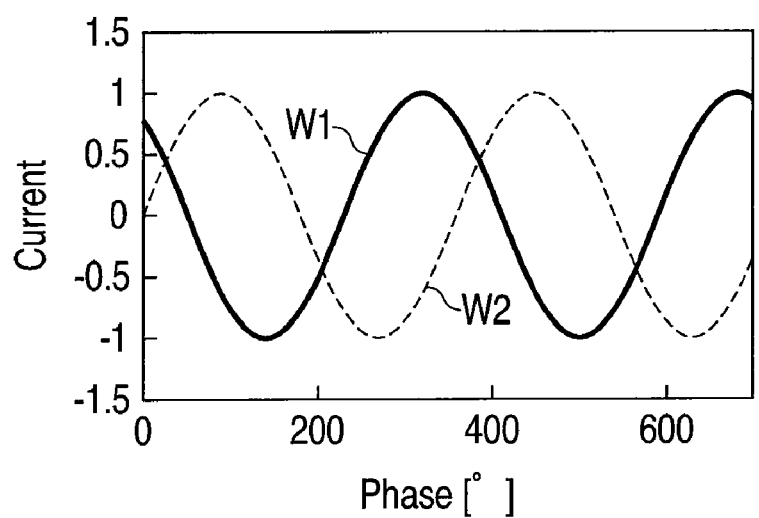
FIG. 17 is a diagram showing a phase difference between currents in the interleave circuit shown in FIG. 16.

FIG. 8 is a circuit diagram typically showing the interleave circuit 41 of the present embodiment. The interleave circuit 41 comprises respective midpoints M1 and M2 of the first and second interleaved conductors 61 and 62. FIG. 9 shows current waveforms A1 and A2 measured at the midpoints M1 and M2, respectively. The waveforms of the interleave circuit 41 of the present embodiment, compared to those (FIG. 17) of the conventional interleave circuit, have better electrical properties involving a smaller phase difference.

Figure 10:
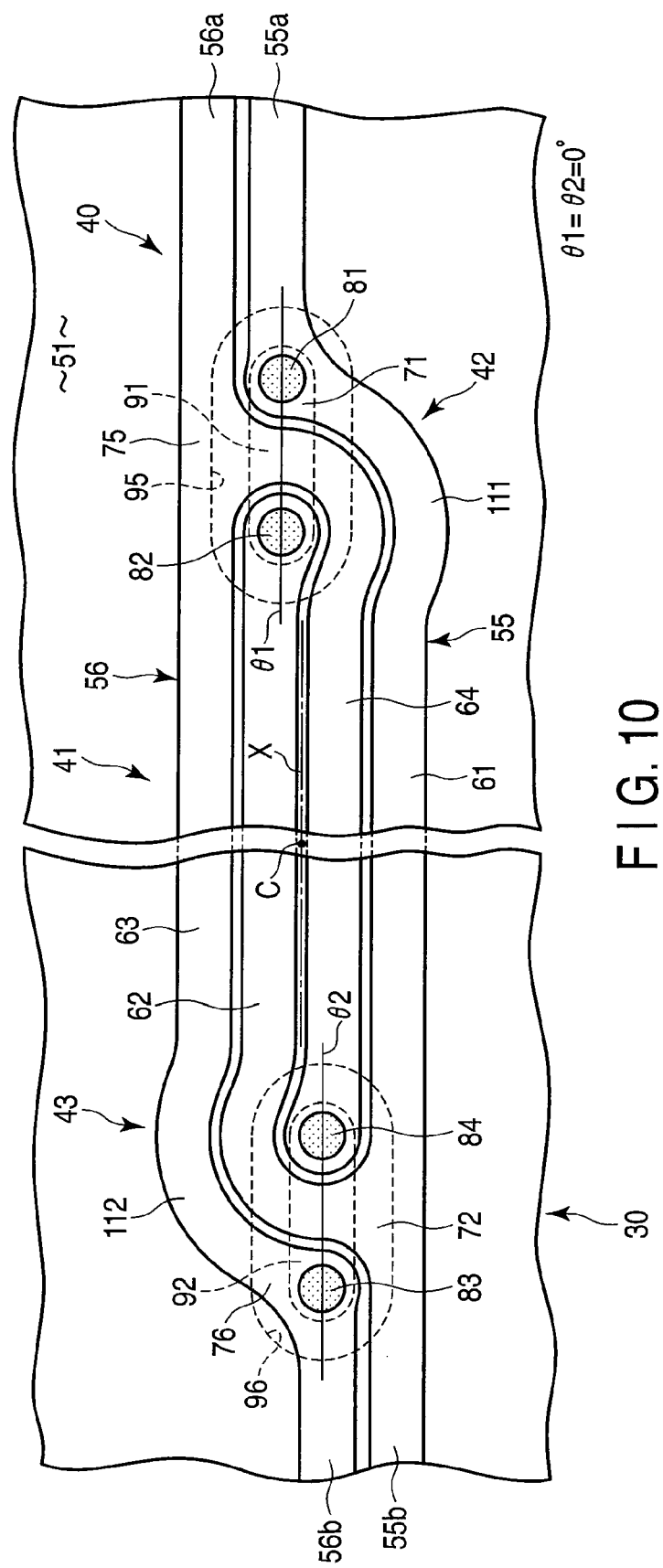
FIG. 10 is a partial plan view of an interleave circuit according to a second embodiment of the invention.

FIG. 10 shows an interleave circuit 41 according to a second embodiment of the invention. In the case of this embodiment, angles θ1 and θ2 of first and second jumper conductors 91 and 92 are 0°. Since other configurations of the interleave circuit 41 are the same as those of the first embodiment, common numbers are used to designate common portions of the first and second embodiments, and a description of those portions is omitted.

Figure 11:
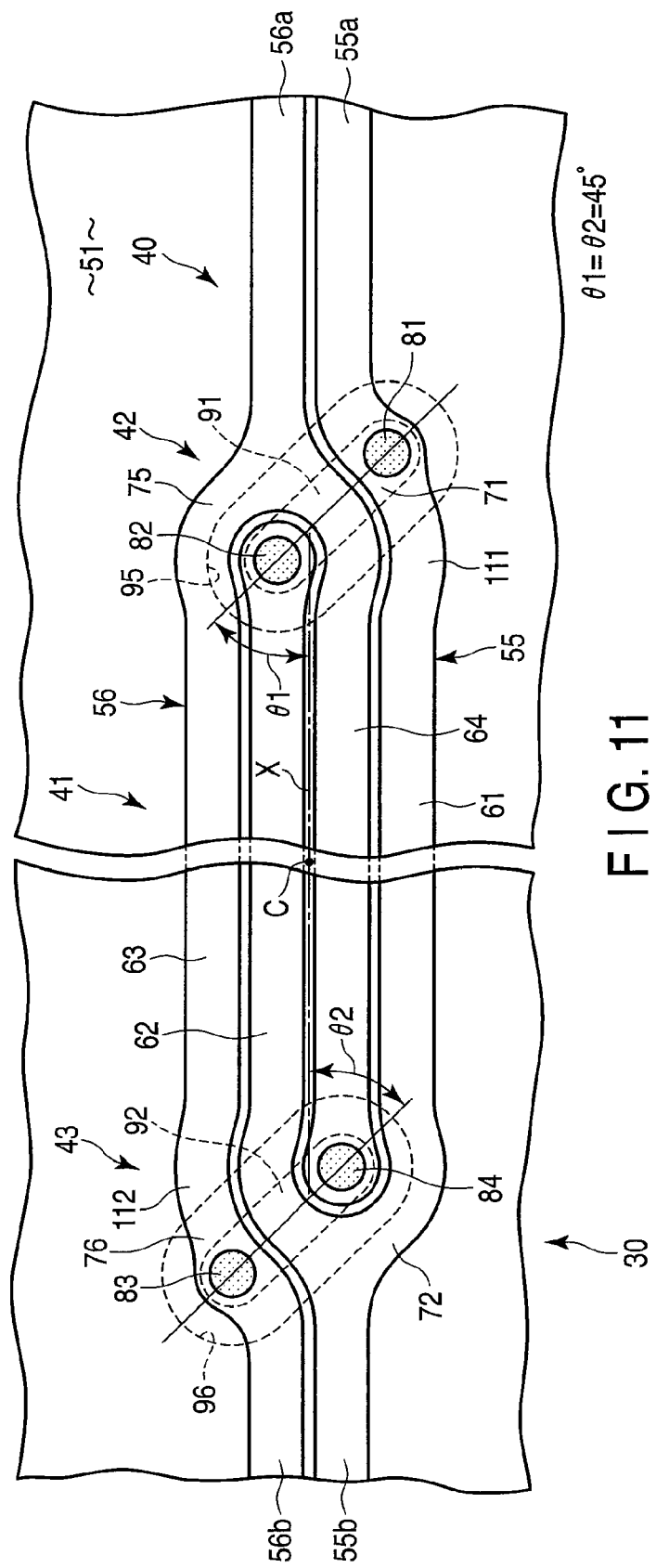
FIG. 11 is a partial plan view of an interleave circuit according to a third embodiment of the invention.
Figure 16:
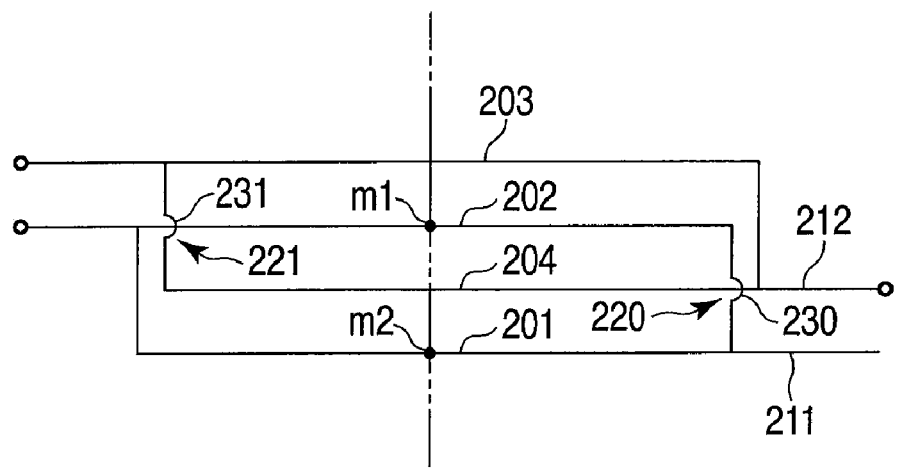
FIG. 16 is a circuit diagram typically showing a conventional interleave circuit.

FIG. 11 shows an interleave circuit 41 according to a third embodiment of the invention. In the case of this embodiment, angles θ1 and θ2 of first and second jumper conductors 91 and 92 are 45°. Since other configurations of the interleave circuit 41 are the same as those of the first embodiment, common numbers are used to designate common portions of the first and third embodiments, and a description of those portions is omitted.

FIG. 12 shows an interleaved branch section 42 of an interleave circuit 41' according to a first comparative example. An interleaved joint section (not shown) is shaped to be point-symmetrical with the interleaved branch section 42. Angles θ1 and θ2 of jumper conductors 91 and 92 of the first comparative example are 60°.

FIG. 13 shows an interleaved branch section 42 of an interleave circuit 41' according to a second comparative example. An interleaved joint section (not shown) is shaped to be point-symmetrical with the interleaved branch section 42. Angles θ1 and θ2 of jumper conductors 91 and 92 of the second comparative example are 90°.

FIG. 14 shows an interleaved branch section 42 of an interleave circuit 41' according to a third comparative example. An interleaved joint section (not shown) is shaped to be point-symmetrical with the interleaved branch section 42. Angles θ1 and θ2 of jumper conductors 91 and 92 of the third comparative example are 120°.

FIG. 15 shows relationships between the angles θ1 and θ2 of the jumper conductors 91 and 92 and the bandwidth that allows transfer with a loss of 3 dB. The higher the bandwidth, the higher the density of possible data transfer is. The bandwidth of the second embodiment (FIG. 10) with the angles θ1 and θ2 at 0°, out of the embodiments described above, is as high as about 23a GHz, representing an electric property suitable for high-speed data transfer.

Further, a higher bandwidth is obtained in the case of the first embodiment (FIG. 4) with the angles θ1 and θ2 at 30°. Also, a bandwidth of 23 GHz or more is obtained in the third embodiment (FIG. 11) with the angles θ1 and θ2 at 45°.

In the first comparative example (FIG. 12) with the angles θ1 and θ2 at 60°, on the other hand, the bandwidth is much lower than in the first to third embodiments (with θ1 and θ2 at 0 to 45°). The bandwidth in the second comparative example (FIG. 13) with the angles θ1 and θ2 at 90° is substantially equal to that in the first comparative example. The bandwidth in the third comparative example (FIG. 14) with the angles θ1 and θ2 at 120° is further lower than those in the first and second comparative examples.

Thus, it is to be desired that the jumper conductors 91 and 92 be bent at their respective angles θ1 and θ2 of less than 45° to the axis X that extends in the wiring direction of the interleaved conductors 61 to 64. In the interleave circuits 41 of the first to third embodiments, the jumper conductors 91 and 92 are inclined at their respective angles θ1 and θ2 of less than 45° to the axis X. In addition, the angles θ1 and θ2 of the first and second jumper conductors 91 and 92 are equal. Accordingly, the interleave circuits 41 of the first to third embodiments are suitable for data transfer in a high-frequency band.

In the first to third embodiments, the first jumper conductor 91 is formed flush with the metal base 50 that is located opposite from the interleaved conductors 61 to 64 with the resin layer 51 therebetween. The second jumper conductor 92 is also formed flush with the metal base 50 that is located opposite from the interleaved conductors 61 to 64 with the resin layer 51 therebetween. Thus, conductive paths including the jumper conductors 91 and 92 are individually cranked so that a phase difference may be produced between a high-frequency current that passes through the jumper conductors 91 and 92 and one that does not.

In the first to third embodiments, therefore, the first bent portion 111 for extending the corresponding conductive path is formed between the first interleaved conductor 61 and first conductor branch section 71. Further, the second bent portion 112 is formed between the third interleaved conductor 63 and second conductor joint section 76. Thus, the phase difference can be reduced.

According to the interleave circuit 41 of the present invention, as described above, high-frequency attenuation can be reduced, and the flexure 30 obtained is suitable for high-speed data transfer. Further, the amplifier-side first conductor 55a and second interleaved conductor 62 electrically conduct to each other through the first jumper conductor 91 that is flush with the metal base 50. Furthermore, the head-side second conductor 56b and fourth interleaved conductor 64 electrically conduct to each other through the second jumper conductor 92 that is flush with the metal base 50. Thus, the jumper conductors 91 and 92 never project outwardly relative to the thickness of the interleave circuit 41. Since the jumper conductors 91 and 92 are formed by partially etching the metal base 50, moreover, dedicated components for the conductors 91 and 92 are unnecessary. In addition, the respective surfaces of the conductors 91 and 92 can be made flush with that of the metal base 50.

It is to be understood, in carrying out the present invention, that the constituent elements of the invention, including the first and second conductor members, interleaved branch and joint sections, interleaved conductors, etc., as well as the metal base and resin layer that constitute the flexure, may be embodied in various forms without departing from the spirit or scope of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk drive flexure comprising
a metal base formed of a metal plate;
an electrically insulating resin layer formed on the metal base and comprising a first surface in contact with the metal base and a second surface located opposite from the metal base;
a first conductor member disposed on the second surface of the resin layer; and
a second conductor member disposed parallel to the first conductor member on the second surface of the resin layer,
the first conductor member comprising
an amplifier-side first conductor connected to an amplifier,
a head-side first conductor connected to a magnetic head,
a first interleaved conductor formed between the amplifier-side first conductor and the head-side first conductor, connecting with the amplifier-side first conductor through a first conductor branch section, and connecting with the head-side first conductor through a first conductor joint section, and
a second interleaved conductor extending parallel to the first interleaved conductor and connecting with the head-side first conductor through the first conductor joint section,
the second conductor member comprising
an amplifier-side second conductor connected to the amplifier,
a head-side second conductor connected to the magnetic head,
a third interleaved conductor formed between the amplifier-side second conductor and the head-side second conductor, connecting with the amplifier-side second conductor through a second conductor branch section, and connecting with the head-side second conductor through a second conductor joint section, and
a fourth interleaved conductor located between and parallel to the first interleaved conductor and the second interleaved conductor and connecting with the amplifier-side second conductor through the second conductor branch section,
the flexure further comprising:
a first jumper conductor formed on the first surface of the resin layer so as to be flush with the metal base, electrically isolated from the metal base, connecting with the first conductor branch section through a first terminal which penetrates the resin layer relative to the thickness thereof, and connecting with the second interleaved conductor through a second terminal which penetrates the resin layer relative to the thickness thereof; and
a second jumper conductor formed on the first surface of the resin layer so as to be flush with the metal base, electrically isolated from the metal base, connecting with the second conductor joint section through a third terminal which penetrates the resin layer relative to the thickness thereof, and connecting with the fourth interleaved conductor through a fourth terminal which penetrates the resin layer relative to the thickness thereof,
the first jumper conductor and the second jumper conductor being individually inclined at angles of less than 45° to an axis which extends in a wiring direction of each of the interleaved conductors.

2. A disk drive flexure according to claim 1, wherein each of the first and second jumper conductors is a partially etched insular portion of the metal base.

3. A disk drive flexure according to claim 1, wherein the angle of the first jumper conductor and the angle of the second jumper conductor are equal.

4. A disk drive flexure according to claim 2, wherein the angle of the first jumper conductor and the angle of the second jumper conductor are equal.

5. A disk drive flexure according to claim 1, further comprising a first bent portion formed between the first conductor branch section and the first interleaved conductor and bent opposite from the first jumper conductor with respect to the axis and a second bent portion formed between the second conductor joint section and the third interleaved conductor and bent opposite from the second jumper conductor with respect to the axis.

6. A disk drive flexure according to claim 2, further comprising a first bent portion formed between the first conductor branch section and the first interleaved conductor and bent opposite from the first jumper conductor with respect to the axis and a second bent portion formed between the second conductor joint section and the third interleaved conductor and bent opposite from the second jumper conductor with respect to the axis.

7. A disk drive flexure according to claim 3, further comprising a first bent portion formed between the first conductor branch section and the first interleaved conductor and bent opposite from the first jumper conductor with respect to the axis and a second bent portion formed between the second conductor joint section and the third interleaved conductor and bent opposite from the second jumper conductor with respect to the axis.

8. A disk drive flexure according to claim 4, further comprising a first bent portion formed between the first conductor branch section and the first interleaved conductor and bent opposite from the first jumper conductor with respect to the axis and a second bent portion formed between the second conductor joint section and the third interleaved conductor and bent opposite from the second jumper conductor with respect to the axis.

* * * * *